(12) United States Patent
Gunn et al.

(10) Patent No.: US 7,852,211 B2
(45) Date of Patent: Dec. 14, 2010

(54) MOBILE SURVEILLANCE AND SECURITY SYSTEM, SURVEILLANCE AND SECURITY SYSTEM HAVING A MOBILE SURVEILLANCE AND SECURITY UNIT, AND METHODS OF OPERATING THE SAME

(75) Inventors: John T. Gunn, Charlotte, NC (US); David R. Pritchard, Winston-Salem, NC (US); Robert P. Edwards, Mount Airy, NC (US)

(73) Assignee: Clark Equipment Company, West Fargo, ND (US)

( * ) Notice: Subject to any disclaimer, the term of this patent is extended or adjusted under 35 U.S.C. 154(b) by 627 days.

(21) Appl. No.: 11/761,071

(22) Filed: Jun. 11, 2007

(65) Prior Publication Data

US 2007/0285270 A1  Dec. 13, 2007

Related U.S. Application Data

(60) Provisional application No. 60/804,471, filed on Jun. 12, 2006.

(51) Int. Cl.
*G08B 13/00* (2006.01)
(52) U.S. Cl. .................................. 340/541; 340/693.6
(58) Field of Classification Search ................. 340/541, 340/540, 693.6; 396/427
See application file for complete search history.

(56) References Cited

U.S. PATENT DOCUMENTS

| | | | |
|---|---|---|---|
| 3,715,953 A | 2/1973 | Allan | |
| 3,975,101 A * | 8/1976 | Copeland | 356/389 |
| 3,984,628 A | 10/1976 | Sharp | |
| 4,051,525 A | 9/1977 | Kelly | |
| 4,097,893 A | 6/1978 | Camras | |
| 4,367,458 A * | 1/1983 | Hackett | 340/539.16 |
| 4,720,805 A | 1/1988 | Vye | |
| 4,815,757 A | 3/1989 | Hamilton | |
| 4,913,458 A | 4/1990 | Hamilton | |
| 5,434,614 A | 7/1995 | Dainty | |
| 5,648,731 A * | 7/1997 | Decker et al. | 324/767 |
| 5,661,463 A * | 8/1997 | Letchak et al. | 340/636.15 |
| 5,806,963 A | 9/1998 | Miller et al. | |
| D399,595 S | 10/1998 | Miller et al. | |
| 5,929,538 A * | 7/1999 | O'Sullivan et al. | 307/66 |
| 6,262,764 B1 | 7/2001 | Perterson | |
| 6,375,370 B1 | 4/2002 | Wesselink et al. | |
| 6,585,428 B1 | 7/2003 | Wesselink et al. | |
| 6,625,812 B2 | 9/2003 | Abrams et al. | |
| 6,709,171 B2 | 3/2004 | Wesselink et al. | |
| 6,709,172 B2 | 3/2004 | Brown | |
| 6,801,128 B1 * | 10/2004 | Houston | 340/556 |

(Continued)

OTHER PUBLICATIONS

PCT/US2007/070869 International Search Report and Written Opinion mailed Jul. 15, 2008, 12 pages.

*Primary Examiner*—George A Bugg
*Assistant Examiner*—Kerri McNally
(74) *Attorney, Agent, or Firm*—Michael Best & Friedrich LLP

(57) ABSTRACT

A mobile surveillance and/or security unit. The unit includes a trailer, a tower mounted to the trailer, a plurality of apparatus positioned on the tower, and at least one power source configured to provide power to the plurality of apparatus. In addition, at least one of the plurality of apparatus is a communication apparatus.

29 Claims, 5 Drawing Sheets

U.S. PATENT DOCUMENTS

| | | |
|---|---|---|
| 6,877,581 B2 * | 4/2005 | Badr et al. .................. 180/311 |
| 7,059,783 B1 | 6/2006 | Wesselink et al. |
| 7,111,997 B2 | 9/2006 | Wesselink et al. |
| 7,193,508 B2 | 3/2007 | Hill et al. |
| 2002/0167587 A1 | 11/2002 | Ogasawara |
| 2003/0025791 A1 | 2/2003 | Kaylor et al. |
| 2004/0010349 A1 | 1/2004 | Perez et al. |
| 2004/0046688 A1 * | 3/2004 | Bigge et al. .................... 342/52 |
| 2004/0258404 A1 | 12/2004 | Brown |
| 2005/0162544 A1 | 7/2005 | Wong |
| 2005/0179539 A1 * | 8/2005 | Hill et al. ................. 340/539.1 |
| 2005/0226610 A1 | 10/2005 | Wesselink et al. |
| 2006/0017809 A1 * | 1/2006 | Carroll ....................... 348/158 |
| 2006/0071130 A1 * | 4/2006 | Kopitar et al. .............. 248/157 |

* cited by examiner

MOBILE SURVEILLANCE AND SECURITY SYSTEM, SURVEILLANCE AND SECURITY SYSTEM HAVING A MOBILE SURVEILLANCE AND SECURITY UNIT, AND METHODS OF OPERATING THE SAME

RELATED APPLICATION

The present patent application claims the benefit of prior filed U.S. Provisional Patent Application No. 60/804,471, filed Jun. 12, 2006, the entire contents of which are hereby incorporated by reference.

FIELD OF THE INVENTION

The invention relates to a mobile surveillance and security system. The invention also relates to a surveillance and security system having a mobile surveillance and security unit. Further, the invention relates to a method of operating the mobile surveillance and security system and a method of operating the surveillance and security system having a mobile surveillance and security unit.

BACKGROUND

There are many applications where a mobile surveillance and security system would be desirable. For example, a temporary outdoor event may require security services for a short period of time. Video surveillance is required in some situations, which requires the mounting and wiring of cameras at strategic locations within the event. These installations require time and can be inflexible. A self-contained, mobile surveillance and security system could help in these environments.

SUMMARY

In one embodiment, the invention provides a mobile surveillance and security system (also referred to herein as "the mobile system") having one or more power sources, such as an alternator, a photovoltaic array, a fuel cell, or the like, and a surveillance apparatus, such as a closed circuit camera, an IP camera, a motion sensor, a microphone, a radiation sensor, a temperature sensor, a weather sensor, or the like, electrically coupled to the power source.

The mobile system can further include a frame, a wheel supporting the frame, and a structure (e.g., an expandable tower) supported by the frame. The power source can be supported by the frame and the surveillance apparatus can be supported by the structure.

The mobile system can further include a security apparatus electrically coupled to the power source and in communication with the surveillance apparatus. The security apparatus can be electrically coupled to the power source (e.g., directly, via a battery, etc.). Example security apparatus can include an audible alarm; a visual alarm; a communication to an apparatus distinct from the mobile system; or the like.

The mobile system can further include a communication apparatus electrically coupled to the power source and in communication with the surveillance apparatus and the security apparatus. It is also envisioned that the communication apparatus can be in communication with other apparatus of the mobile system (e.g., the power sources). The communication apparatus communicates information to other apparatus in communication with the mobile system. For example, the communication apparatus can communicate surveillance information and/or security information to a remote monitoring apparatus or system, such as a remote server, a remote user-controlled interface, or the like.

In another embodiment, the invention provides a surveillance and security system (also referred to herein simply as "the system") having a mobile surveillance and security unit (also referred to as "the unit") and a remote monitoring and control apparatus or system (collectively referred to as "the remote apparatus") in communication with the unit. Typically, the system has multiple units in communication with the remote apparatus. For example, the multiple units can be in wireless communication with the remote apparatus to provide surveillance information to the remote apparatus. Other information (e.g., status information) can be communicated from the units to the remote apparatus, and the remote apparatus can communicate information (e.g., command or control information) to the units. The communication between the units and the remote apparatus can include a wire connection or a wireless connection, such as a cellular connection, a Wi-Fi or wireless Ethernet connection, a Bluetooth connection, a satellite connection, or the like.

In another embodiment, the invention provides a mobile surveillance and/or security unit. The unit includes a trailer, a tower mounted to the trailer, a plurality of apparatus positioned on the tower, and at least one power source configured to provide power to the plurality of apparatus. In addition, at least one of the plurality of apparatus is a communication apparatus.

In another embodiment, the invention provides a mobile surveillance and/or security unit, including a trailer, a tower mounted to the trailer, a power manager, a communication manager, an apparatus manager, an input device positioned on the tower, a communication apparatus coupled to the communication manager, and a power source configured to provide power to the input device. The power source includes a battery, a photovoltaic array, and an engine powered generator.

In another embodiment, the invention provides a mobile surveillance and/or security unit, including a trailer, a tower mounted to the trailer, a plurality of devices positioned on the tower, and a power source positioned on the tower. At least one of the plurality of devices is a communication apparatus. In addition, the power source is configured to provide power to the plurality of devices.

In another embodiment, the invention provides a method of powering a mobile surveillance and/or security unit. The method includes the acts of coupling at least one surveillance and/or security apparatus to a battery, monitoring a charge of the battery, monitoring a capacity of a photovoltaic array providing a charge to the battery, and operating a generator when the battery charge is below a first threshold and the capacity of the photovoltaic array is below a second threshold.

In another embodiment, the invention provides a mobile system, including a plurality of mobile surveillance and/or security units. The units include a trailer, a tower mounted to the trailer, a plurality of apparatus positioned on the tower, wherein at least one of the plurality of apparatus is a communication apparatus, and at least one power source configured to provide power to the plurality of apparatus. One of the units also includes a wireless router.

Other features of the invention will become apparent by consideration of the detailed description and accompanying drawings.

DETAILED DESCRIPTION

Figure 1:
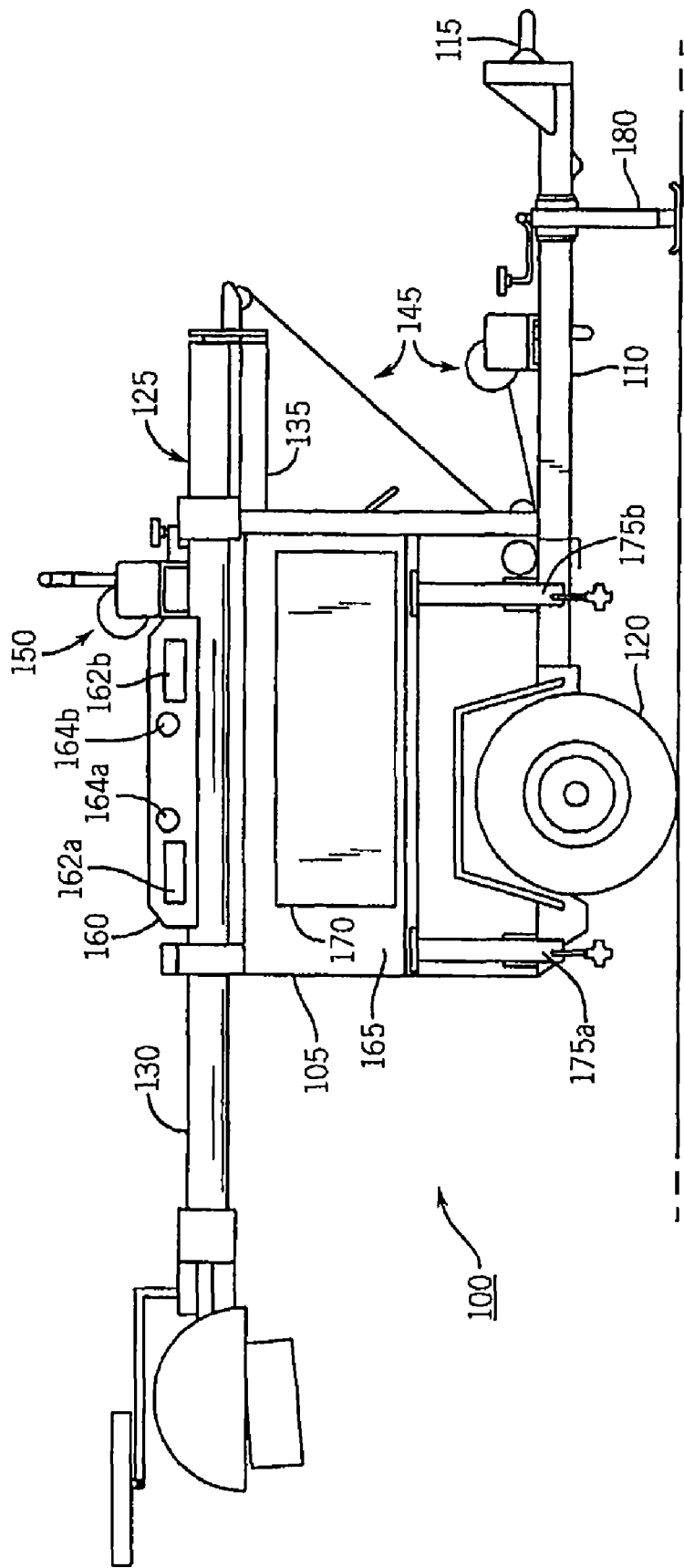
FIG. 1 is a side view of a mobile surveillance and security system in a retracted position.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, it should be understood that embodiments of the invention include hardware, software, and electrical components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible.

Figure 2:
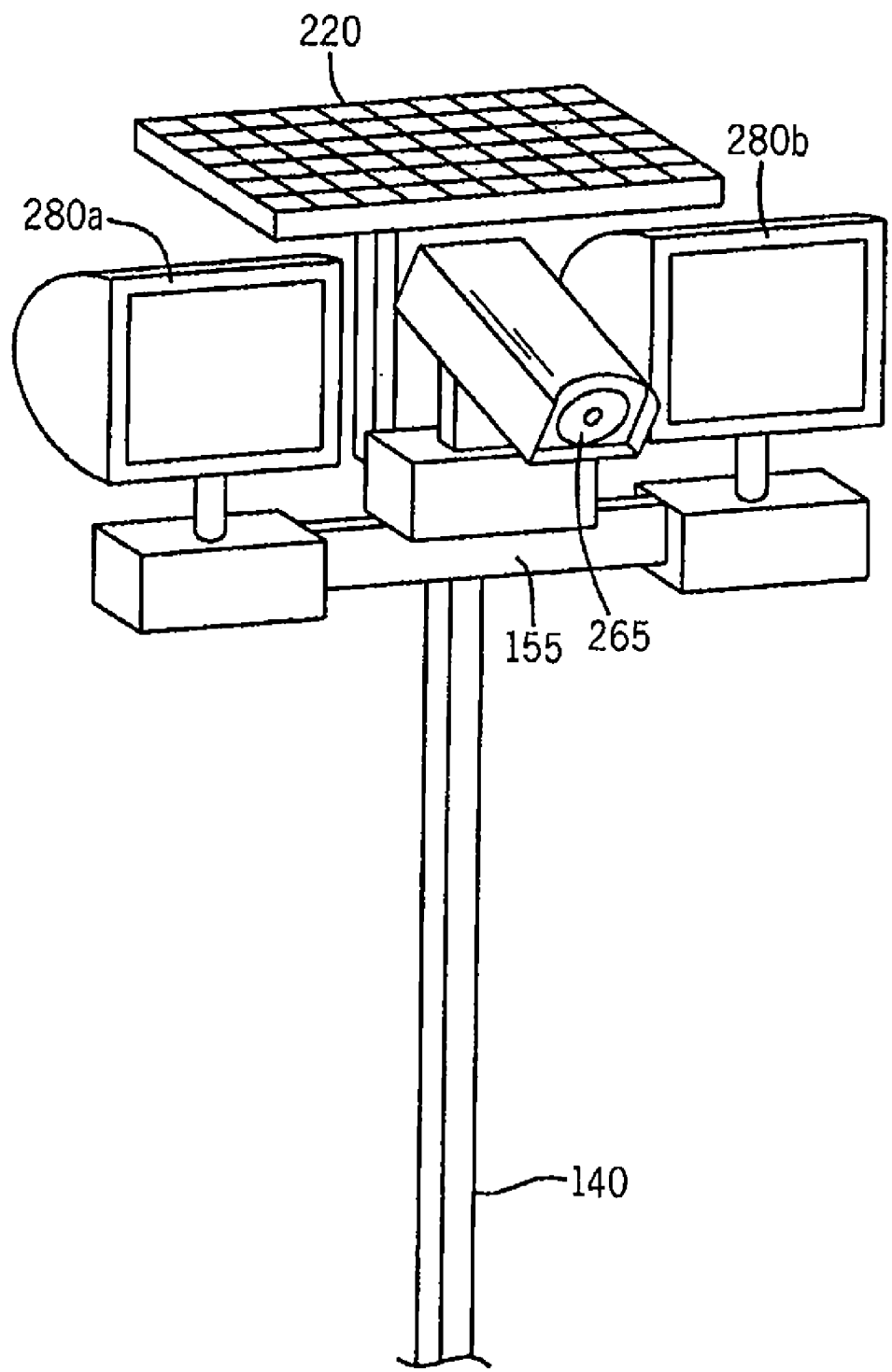
FIG. 2 is a perspective view of a portion of the mobile surveillance and security system of FIG. 1 in the extended position.
Figure 3:
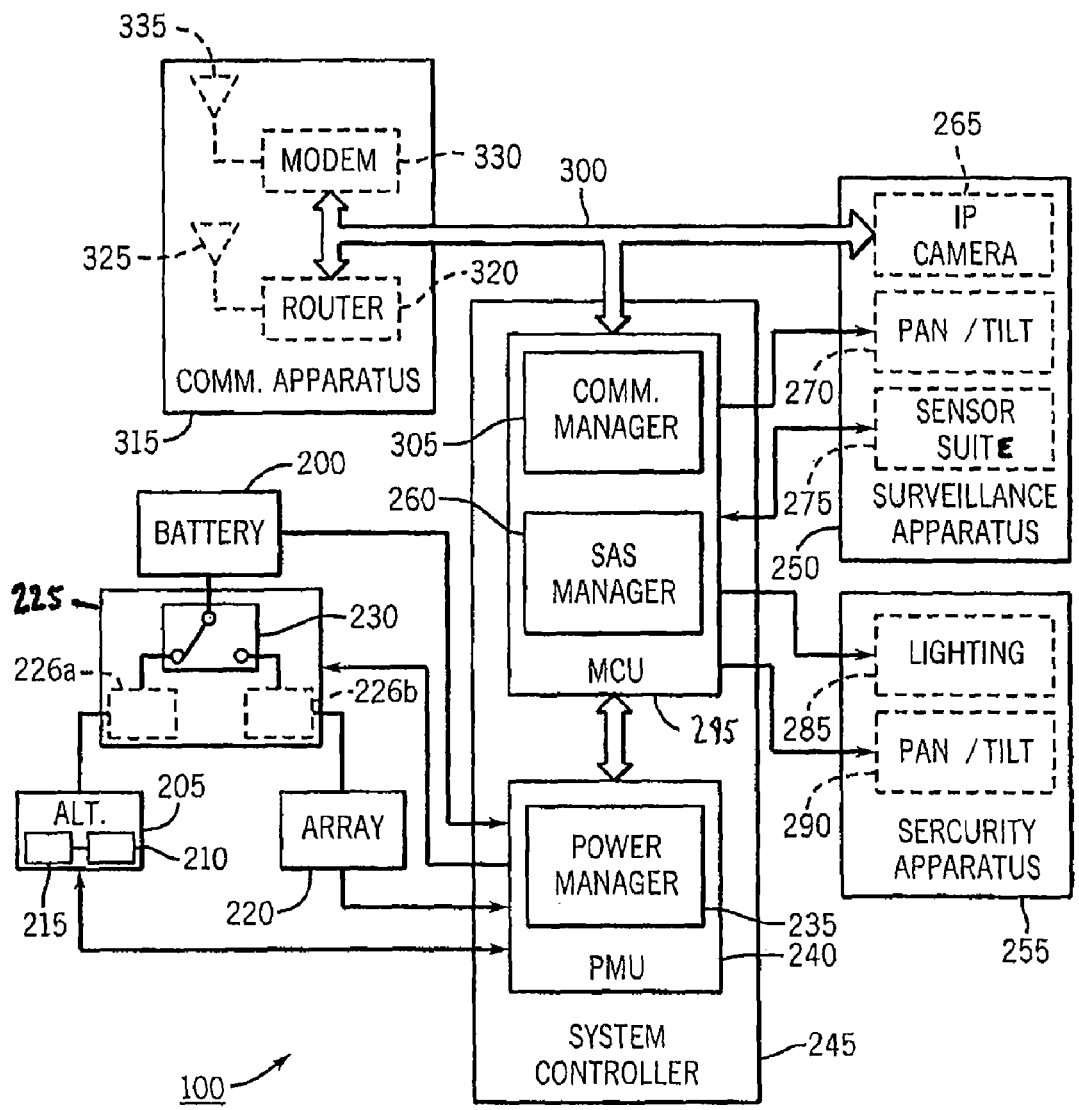
FIG. 3 is a block diagram representing the interaction of some of the apparatus of the mobile surveillance and security system of FIG. 1.

Turning now to the drawings, FIGS. 1-3 generally illustrate a mobile surveillance and security system 100. As used herein, the phrase "mobile system 100" may be used to reference the mobile surveillance and security system 100. However, for simplicity, it should be understood that the terms "mobile system" and "mobile surveillance and security system" cover mobile surveillance and/or security systems. The mobile system 100 includes an enclosure 105 that is supported by a running gear or frame 110. The frame 110 is adapted to be connected to a truck or other suitable vehicle by a hitch 115. The mobile system 100 is shown as having one or more wheels (wheel 120 is shown) mounted to the frame 110.

It is envisioned that the mobile system 100 can include other means of movement (e.g., is self-motive) and/or include other apparatus for allowing movement (e.g., crawler tracks in place of wheels).

The mobile system 100 includes a movable tower assembly 125 including at least one light tower member. The movable tower assembly 125 is movable between a retracted, first horizontal position substantially parallel to the running gear, as shown in FIG. 1, and an extended, second vertical position (best shown in FIG. 2) substantially perpendicular to the frame 110. For purposes of describing the embodiment shown in FIGS. 1 and 2, the mobile system 100 has three tower members—a first tower member 130, fixed to anchor member 135, and second and third tower members (the third tower member 140 is best shown in FIG. 2), nested in the first tower member 130. The three tower members are movable relative to the anchor member 135 between the first and second positions by a system of winches, cables, and pulleys (best shown as 145 and 150). While the winches, cables, and pulleys 145 and 150 are shown as being exposed, they may be housed within an enclosure. Also, while the winches are shown as being manual winches, the winches may be powered by a motor and be electrically controlled. It is also envisioned that the number and style of the tower members and related expansion control can vary.

As best shown in FIG. 2, support bar 155 is fixed to the free end of the third tower member 140 transverse to the third tower member 140. As discussed further below, surveillance and/or security equipment is coupled to the support bar 155.

As shown most clearly in FIG. 1, a unitary bail and forklift plate 160 is fixedly attached to tower member 130. The plate 160 is welded to the first tower member 130 transverse to the tower member 130 so that when the tower member 130 is in the first position, the plate 160 is located above enclosure 105 and is readily accessible to a crane, forklift, or other device used to lift the light tower. The plate 160 is elongated and includes first and second forklift apertures 162a and 162b located at the ends of the plate, and a pair of bail lift apertures 164a and 164b spaced between the forklift apertures. The forklift apertures 162a and 162b are rectangular and are therefore adapted to receive forks of a conventional forklift. The bail apertures 164a and 164b are circular and are adapted to receive a hook member.

The enclosure 105 of mobile system 100 includes a front panel, a rear panel, a left side panel, a right side panel 165, a top panel, and a bottom panel. The panels together define an enclosure interior. An enclosure door 170 is hingeably connected to one of the panels and allows an operator to gain access to the enclosure interior. One or more of the panels can include one or more openings for drawing ambient air into the enclosure 105 and one or more openings for exhausting hot gases from the enclosure 105. Additional enclosure doors may also be included to provide access to controls or power receptacles (e.g., 120vac outlets).

As shown in FIG. 1, the mobile system 100 includes outrigger support assemblies (assemblies 175a and 175b are shown) and running gear jack 180. The assemblies 175a and 175b, and jack 180 to prevent the mobile system 100 from tipping during use. The assemblies 175a, and 175b and jack 180 are also used to level the mobile system 100 when it is positioned for use on sloped or uneven ground. The jack 180 is conventionally connected to the running gear drawbar and is extendable and retractable by a crank assembly. Each outrigger assembly is connected to the frame or enclosure and includes a convention shaft and crank assembly for positioning the mobile unit. In some constructions, jack assemblies replace the outriggers and are mounted under the corners of the mobile system 100 to provide support and leveling of the mobile system 100.

A schematic representation of a portion of the electrical components of the mobile system 100 is provided in FIG. 3. As shown in FIG. 3, the mobile system 100 includes a power source. The power source includes a battery 200 and one or more additional power sources for recharging the battery and/or providing power to the mobile system 100. The battery 200 can include, for example, two to four, deep cycle gel type 12vdc batteries connected in parallel. Examples of additional power sources include, but are not limited to, an alternating current generator coupled to a portable internal combustion engine, a photovoltaic array, a fuel cell, a wind generator, and even utility power connected via a power cord. However, it is preferable that the mobile system 100 be a self-contained system (i.e., it is preferable that the mobile system 100 includes at least one power source supported by the frame 110). In some constructions, one or more power sources can be positioned on the top of the tower 140 to power surveillance and/or security equipment also positioned on the top of the tower 140.

For the construction shown, the mobile system 100 includes a generator 205 having an alternating current generator 210, including an internal combustion engine 215. The alternating current generator 210 can power surveillance and/or security apparatus (discussed below) directly when the generator 210 is operating. The mobile system 100 further includes a photovoltaic array 220. The photovoltaic array 220 can be positioned on the tower 140 as shown in FIG. 2 or can be mounted to the enclosure 105 (not shown). The generator 205 and the photovoltaic array 220 are coupled to the battery 200 via power conditioning and regulating circuitry 225. The power conditioning and regulating circuitry 225 includes conventional circuitry for conditioning (e.g., circuitry for rectifying the power from the generator 205) and for regulating the power provided by the generator 205 and/or the photovoltaic array 220. That is, the power conditioning and regulating circuitry 225 conditions and regulates the power of the power sources to a proper power (e.g., a proper voltage) for charging the battery 200.

While the generator 205 and the photovoltaic array 220 are shown as providing power to the same circuitry 225, the circuitry 225 can comprise multiple power conditioning and regulating circuits 226a and 226b designed for the respective power sources 205 and 220. Additionally, while the power conditioning and regulating circuits 226a and 226b are separately shown from the generator 205 and the photovoltaic array 220, respectively, the circuits 226a and/or 226b can be combined with the generator 205 and the photovoltaic array 220, respectively. The power and regulating circuitry 225 can further include one or more switches (switch 230 is shown) connected in circuit between the one or more power sources and the battery 200. The switch 230 breaks and promotes a current path between the one or more power sources and the battery in response to a control signal. In some constructions, the one or more power sources (e.g., the generator 205 and the photovoltaic array 220 through included power conditioning and regulating circuits 226a and 226b respectively) can be connected directly to the battery 200 using diodes to isolate the one or more power sources from each other.

The switch 230 is controlled by a power manager 235 of a power management unit 240 (also referred to as "the PMU 240"). The PMU 240 is part of a system controller 245, both of which will be discussed further below. The power manager 235 communicates with the battery 200, the generator 205, the photovoltaic array 220, and the switch 230 to monitor and/or control the battery 200, the generator 205, the photovoltaic array 220, and the switch 230. More specifically, the battery manager 200 monitors the state of the battery 235, and controls the switch 230 to controllably power the battery 200. The power manager 235 can further monitor and control the one or more power sources.

For example, if the power manager 235 determines the battery 200 needs to be charged to ensure power is available to operate the mobile system 100, the power manager 235 monitors the photovoltaic array 220 to determine if it can properly charge and support the battery 200. The power manager 235 moves the switch 230 to promote a current from the photovoltaic array 220 when the photovoltaic array 220 can charge and support the battery 200. Alternatively, the power manager 235 can monitor and control the generator 205. For example, if the power manager 235 determines the photovoltaic array 220 cannot properly charge or support the battery 200, the power manager 235 starts the engine 215, monitors the charger 210, and controls the switch 230 to promote a current from the generator 205 to the battery 200. The starting of the engine can be via a starting battery separate from the battery 200. The power manager 235 can then stop the engine 215 after the battery 200 is properly charged. A dc charger coupled to the engine 215, can charge the starting battery while the engine 215 is running. It is also envisioned that the power manager 235 can monitor other parameters (e.g., temperature, oil pressure, fuel level, etc. of the engine 215) of the power sources, and communicate information (e.g., parameter values, alarms, status etc.) as appropriate. For example, the power manager 235 can detect an alarm condition (e.g., low oil pressure) and can automatically communicate the alarm condition to a remote unit. As used herein, the term "information" is broadly construed to comprise signals (e.g., analog signals, digital signals, etc.), states, data (e.g., packet data, non-packet data, etc.), etc., for providing knowledge, values, instructions, events, facts, measures, outcomes, and similar items.

Before proceeding further, it should be apparent from the previous discussion, that the power manager 235 can selectively monitor and/or control the one or more switches and the one or more power sources depending on the status of the battery, the status of the one or more power sources, and/or the amount of power being drawn from the battery 200 (e.g., running a generator when lights are on). It also envisioned that less sophisticated systems can be used for charging the battery 200. For example, it is envisioned that the generator 205 can be continuously run when the mobile system is operating. Alternatively, the power manager 235 and related circuitry (e.g., switch 230) can operate differently depending on the power sources available to the mobile system 100. Additionally, it is envisioned that the one or more power sources can directly power the electrical elements (discussed further below) coupled to the mobile system 100. For example, it is envisioned that the generator 205 can comprise two generators coupled to the engine 215. The two generators can include a first charger for charging the battery 200 and a second generator for directly powering one or more lights (discussed below). As is apparent from this example, the power manager 235 can control the one or more power sources based on information separate from the battery 200.

In some constructions, the photovoltaic array 220 is coupled directly to the battery 200, providing a constant charging current to the battery 200 whenever the photovoltaic array 220 is energized by the sun. The power manager 235 can detect when a charge of the battery 200 is below a threshold indicating that the battery 200 requires recharging. If the power manager 235 determines that the photovoltaic array 220 does not have the capacity to charge the battery 200 (e.g., at night or on a cloudy day), the power manager 235 can start the generator 205 to charge the battery 200. When the power manager 235 detects that the battery 200 is substantially fully charged, the power manager 235 can stop the generator 205.

Also, it was noted above that the power manager 235 communicates with the battery 200, the generator 205, and the photovoltaic array 220. The communication can be via wire or wireless communication. In the construction shown, the communication is via direct wire connections, however other wire connections are possible (e.g., via a bus).

The battery 200 powers at least some of the electrical components of the mobile system 100, some of which are schematically represented in FIG. 3. However, the battery 200 can electrically power other elements not shown, and can power devices coupled to, but not supported by, the mobile system (e.g., an apparatus coupled to the mobile system via an electrical outlet). Also, it is envisioned that other power sources (e.g., a second generator as discussed above) can be used to power apparatus coupled to and/or supported by the mobile system 100. For these constructions, additional power circuitry (e.g., an inverter and related controller) may be required.

Referring again to FIG. 3, the mobile system 100 includes a surveillance apparatus 250, a security apparatus 255, and a surveillance and security manager 260 (also referred to as "the SAS manager 260"). The surveillance apparatus 250, generally speaking, includes an input device or equipment for monitoring and/or observing a thing, animal, person, group, area, space, or similar concern. For example, the surveillance apparatus 250 can include a camera (e.g., a video camera such as a CCTV camera, an IP camera, a still camera, etc.) or similar device for visually monitoring and/or observing a concern; a microphone or similar device for audibly monitoring and/or observing a concern; a motion sensor or similar device for monitoring and/or observing movements of a concern; a heat sensor or similar device for thermally monitoring and/or observing a concern; a radiation sensor or similar device for monitoring and/or observing radiation of a concern; a weather-related sensor or similar device for monitoring and/or observing weather-related items of a concerns; a GPS receiver for providing a location of the mobile system 100, etc. Of course, the surveillance apparatus 250 can comprise multiple apparatus, and the multiple apparatus may be combined. Furthermore, the concerns for each apparatus may be related. For example, a concern may be a space monitored and/or observed by the mobile system 100, and the mobile system 100 can include a camera, a microphone, and a motion sensor combined as a single piece of equipment or a single apparatus.

For the construction shown in FIG. 3, the surveillance apparatus includes an IP camera 265, such as the NetCam offered by StarDot Technologies at www.stardot-tech.com. In other constructions, the surveillance apparatus can include a CCTV camera coupled to a video encoder. The IP camera 265 can include functions normally associated with security IP cameras, such as low and no-light imaging and capture;
 intrusion detection;
 movement detection;
 remote accessibility for viewing, controlling, and managing imaging and capture;
 password and encryption protection, with granting of temporary access to second parties (e.g., police, fire, maintenance, etc.); and
 video collaboration with other cameras.

The IP camera 265 can be secured to a positioning (e.g., pan/tilt) mechanism 270, which is controlled by the SAS manager 260. That is, if the IP camera does not already include pan/tilt control, it can be mounted to the positioning mechanism 270 for moving the IP camera 265.

As already stated, the surveillance apparatus 250 can include other apparatus beyond the IP camera 265. The additional apparatus are generically shown as sensor suite 275. The sensor suite 275 can be modified to include various security apparatus depending on the concern to be monitored.

Referring again to FIG. 3, the mobile system 100 includes a security apparatus 255. The security apparatus 255, generally speaking, includes an output device or equipment for giving or assuring safety. For example, the security apparatus 255 can include a visual device (e.g., a light, an LED, a television or LCD or similar display, etc.) for giving or assuring safety; and an audible device (e.g., a speaker, an horn, etc.) for giving or assuring safety. The giving or assuring of safety may be in the form of, for example and without limitation, an alarm, a command or an instruction, and information. Of course, the security apparatus 255 can comprise multiple apparatus, and the multiple apparatus may be combined. Furthermore, the giving or assuring safety for each apparatus may be related. For example, in response to a situation, the security equipment may include lights that are activated and audible instructions given by a speaker.

It is also envisioned that the security apparatus 255 can include a non-conventional security apparatus. For example, the security apparatus 255 can include a heater for heating a space, a means for moving the mobile system 100, etc. It is also contemplated that the security apparatus 255 can be a means for communicating information (e.g., via a wireless communication) to other apparatus, systems, units, etc. in communication with the mobile system 100.

For the construction shown, the security apparatus 255 include two tungsten halogen lights 280$a$ and 280$b$ (best shown in FIG. 2), and a means for communicating information to other apparatus, systems, units, etc. in communication with the mobile system 100. The lights can be controlled by a lighting contactor 285 (FIG. 3) and a positioning (e.g., pan/tilt) mechanism 290.

Before proceeding further, it should be understood that the security apparatus 255 and the surveillance apparatus 250 can be combined. For example, the lights 280$a$ and 280$b$ can be used to provide illumination for the assistance of the IP camera 265, and can be used for providing a visual alarm when a condition is met. Other variations are possible.

The surveillance apparatus 250 and the security apparatus 255 are controlled by the SAS manager 260 of a main control unit 295 (also referred to as "the MCU 295). The MCU 295 is part of the system controller 245, both of which will be discussed further below. The operation of the SAS manager 260 for monitoring and controlling the surveillance apparatus 250 and the security apparatus 255 varies depending on the concern being monitored or observed, and the desired result for giving or assuring safety. As an example for the construction shown, the SAS manager 260 controls and monitors the IP camera 265 to observe a space. If a sensed condition results in the space (e.g., the IP camera 265 senses movement), the SAS manager 260 activates and/or varies the illumination of the lights 280 to provide a visual alarm. Additionally, the SAS manager 260 can provide information (e.g., the alarm and video relating to the sensed condition) to the other apparatus, systems, units, etc. in communication with the mobile system 100.

Similar to the power manager 235, the SAS manager 260 can communicate with the surveillance apparatus 250 and the security apparatus 255 via wire or wireless communication. In the construction shown, the communication is via a bus and direct connections. More specifically, the SAS Manager 260 communicates with the IP camera 265 via an Ethernet network 300, and communicates with the positioning mechanism 270, the sensor suit 275, the lighting contactor 285, and the positioning mechanism 290 via direct connections. However, is envisioned that other networks, busses, and communication schemes are possible. For example, it is envisioned that one or more apparatus of the sensor suite 275 can communicate with the SAS manager 260 via the Ethernet network 300.

As shown in FIG. 3, the MCU 295 further includes a communications manager 305. Generally speaking, the communications manager 305 promotes the communication between the MCU 295 and the other apparatus in communication with the MCU 295 via the Ethernet network 300.

The system controller 245 includes the MCU 295 and the PMU 240. The system controller 245 includes circuit elements, such as one or more microcontrollers, discrete circuit elements, integrated or electronic circuitry, etc. for controlling the mobile system 100. In the construction shown, the system controller 245 includes a first microcontroller, identified as the PMU 240, and a second microcontroller, identified as the MCU 295. The system controller also includes a bus 310 (e.g., a CAN bus), which allows the PMU 240 to communicate with the MCU 295. The system controller 245 can include other circuit elements not explicitly disclosed in FIG. 3. For example, the system controller 245 can include circuitry to allow an operator to communicate with the system controller at the mobile system 100 via an operator interface.

It is also envisioned that the system controller 245 can include additional microcontrollers not shown. For example, the functions of the communications manager 305 can be separated into a third microcontroller separate from the microcontroller of the MCU 295. In this construction, the third microcontroller can communicate with the MCU 295 over the bus 310. It is also envisioned that the first and second microcontrollers may be implemented with other devices including a variety of integrated circuits (e.g., an application-specific-integrated circuit) and/or discrete devices, as would be apparent to one of ordinary skill in the art. Further, it is envisioned that the first and second microcontrollers can be combined as a single microcontroller.

The first and second microcontrollers include, among other things, respective processors and memories. Each memory includes one or more software modules having instructions. The processors obtain, interpret, and execute the instructions according to the description provided herein. For example, the processor of the PMU 240 obtains, interprets and executes the instructions from the memory of the PMU 240 to build the power manager 235. Similarly, the processor of the MCU 295 obtains, interprets, and executes the instructions from the memory of the MCU 295 to build the SAS manager 260 and the communications manager 305. Of course, other managers may be created, and the names of the respective managers are meant only to identify the managers for ease of description and are not meant to be limiting. It should also be understood that each microcontroller can include other elements normally associated with microcontrollers. For example, the microcontroller for the PMU 240 can include a power supply, one or more timers, and input/output ports (including digital and analog input ports and digital power output ports). The microcontroller for the MCU 295 can include similar elements.

Referring again to FIG. 3, the mobile system 100 includes a communication apparatus 315, which can be secured in the enclosure 105. The communication apparatus 315, general speaking, includes a device or equipment for promoting communication between the mobile system 100 and other apparatus, systems, units, etc. For the construction shown, the communication apparatus includes a router (or access point) 320 and antenna 325 for promoting communication over a Wi-Fi network, and a cellular modem 330 and antenna 335 for promoting communication over a cellular network. However, it should be apparent that the communication apparatus 315 can include other means for promoting communication, and both the router 320 and cellular modem 330 are not required for all mobile systems 100. For example, the communication apparatus 315 can include a global modem and satellite antenna for promoting communication over a satellite network, or even an outlet for promoting communication over a wire, such as a twisted-pair cable, a coax cable, or a fiber-optics cable. It is also envisioned, that the router 320 and antenna 325 can communicate over other networks in place of, or in addition, to the Wi-Fi network.

With regards to the Ethernet network 300, each device coupled to the network 300 (i.e., IP camera 265, MCU 295, router 320, and modem 330) has its own IP address, and therefore, each device is a node of the network. While the style of the Ethernet network 300 can vary, the network 300 shown is a peer-to-peer network. That is, any device on the Ethernet network 300 acts as a server to the other nodes of the network 300. The nodes of the Ethernet network 300 each include communication equipment (e.g., an Ethernet card) to promote communication on the network 300, as is conventionally known.

As already discussed, the router (or access point) 320 and antenna 335 promote wireless communication with other apparatus, systems, units, etc. The router 320 and antenna 335 can be, for example, a 802.11 g Wi-Fi router available from Cisco Systems, Inc. at www.cisco.com. If the communication apparatus includes an access point, the access point includes equipment suitable for use with the 8021.11g Wi-Fi router. The cellular modem 330 and antenna 335 also promote wireless communication with other apparatus, systems, units, etc. The cellular modem 330 and antenna 335 can be, for example, a GSM/GPRS EDGE cellular wireless modem available from Multi-Tech System, Inc. at www.multitech.com.

In some constructions, the SAS manager 260, the communication manager 305, the communication apparatus 315, the surveillance apparatus 250, and/or the security apparatus 255 are positioned on the tower 140. The battery 200, additional power source(s), and the power management unit 240 can be positioned in the enclosure 105. In some constructions, an additional power source (e.g., a photovoltaic array or battery) can be positioned on the tower 140 enabling the mobile system 100 to continue to operate should cables (e.g., power cables) between the enclosure 105 and the tower 140 be cut or otherwise disabled.

Figure 4:
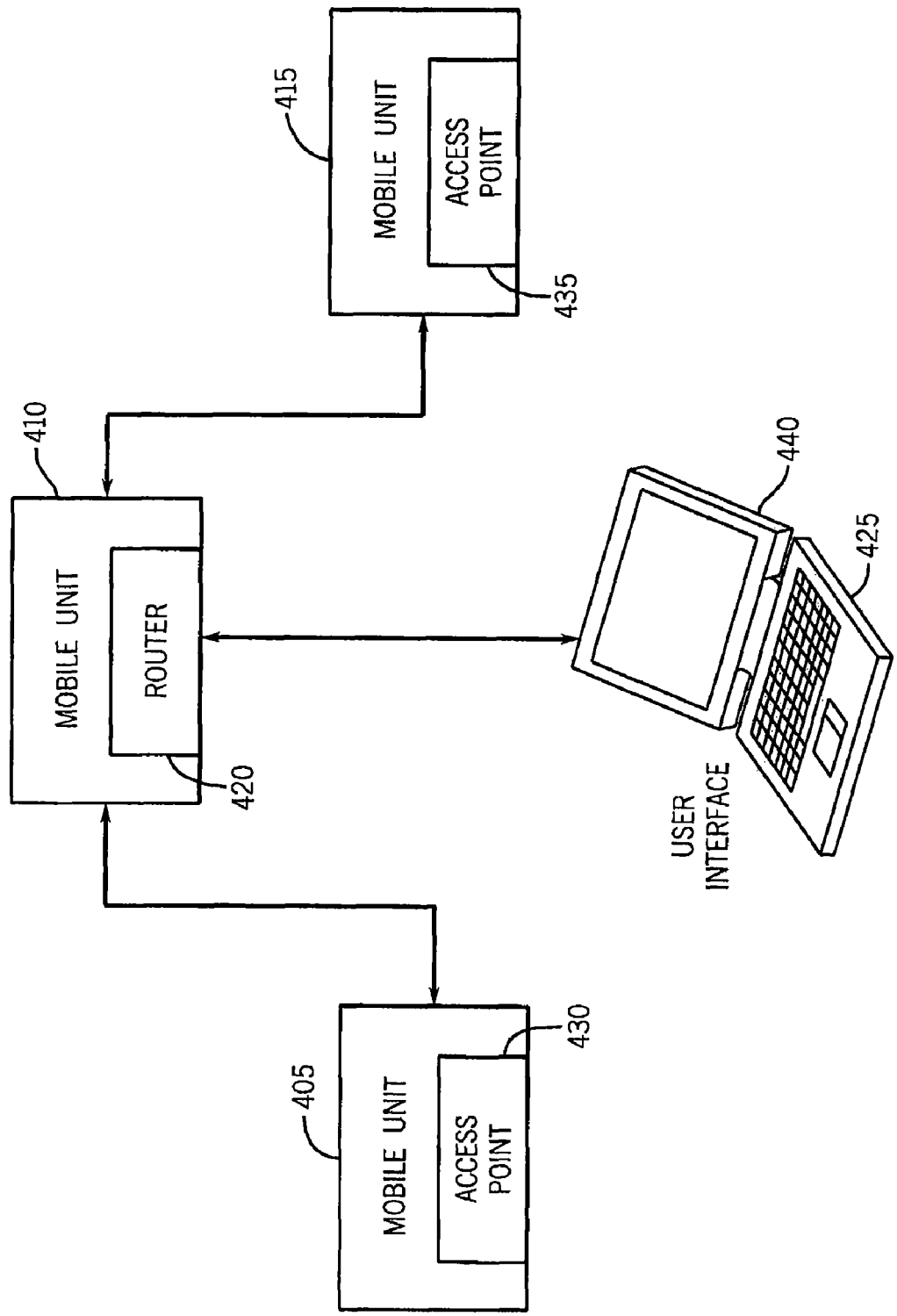
FIG. 4 is a first surveillance and security system having a plurality of mobile surveillance and security units.

Referring now to FIG. 4, the figure shows a surveillance and security system 400 having a plurality of mobile surveillance and security units 405, 410, and 415. As used herein, the phrase "system 400" may be used to reference the surveillance and security system 400. However, for simplicity, it should be understood that the terms "system" and "surveillance and security system" cover surveillance and/or security systems. As used herein, the phrases "unit 405," "unit 410," and "unit 415" may be used to reference the mobile surveillance and security units 405, 410, and 415, respectively. However, for simplicity, it should be understood that the terms "unit" and "mobile surveillance and security unit" cover mobile surveillance and/or security units.

Each unit 405, 410, and 415 can be similar to the mobile system 100 shown in FIGS. 1-3. The unit 410 includes the wireless router 420 to establish a Wi-Fi network. The wireless router 420 routes communication among the other nodes on the Wi-Fi network. More specifically, the units 405 and 415, and a user interface 425 include access points 430, 435, and 440, respectively, that can communicate with the router 420 of the unit 410. Before proceeding further, it should also be apparent, that while three units 405, 410, and 415 are shown in FIG. 4, the number of units can vary and that other configurations for the Wi-Fi network are possible. For example, the network can include multiple routers, and one or more of the routers, may be located external from any unit. In addition and as discussed for the mobile system 100, the network used for providing wireless communication can vary.

FIG. 4 shows an apparatus, identified as the user interface 425, in communication with the unit 410. The user interface 425 can be, for example, a conventional computer (e.g., a desktop computer, a laptop computer, a notepad computer, etc.) having Wi-Fi capabilities to communicate with the unit 410. However, it should be apparent that other apparatus, systems, etc., some of which will be discussed with FIG. 5, can communicate with the unit 410. It should also be apparent that other devices can be used for the user interface 410, including but not limited to, PDAs or hand-held computers, IP devices, email devices, cellular phones, Bluetooth devices, etc.

Figure 5:
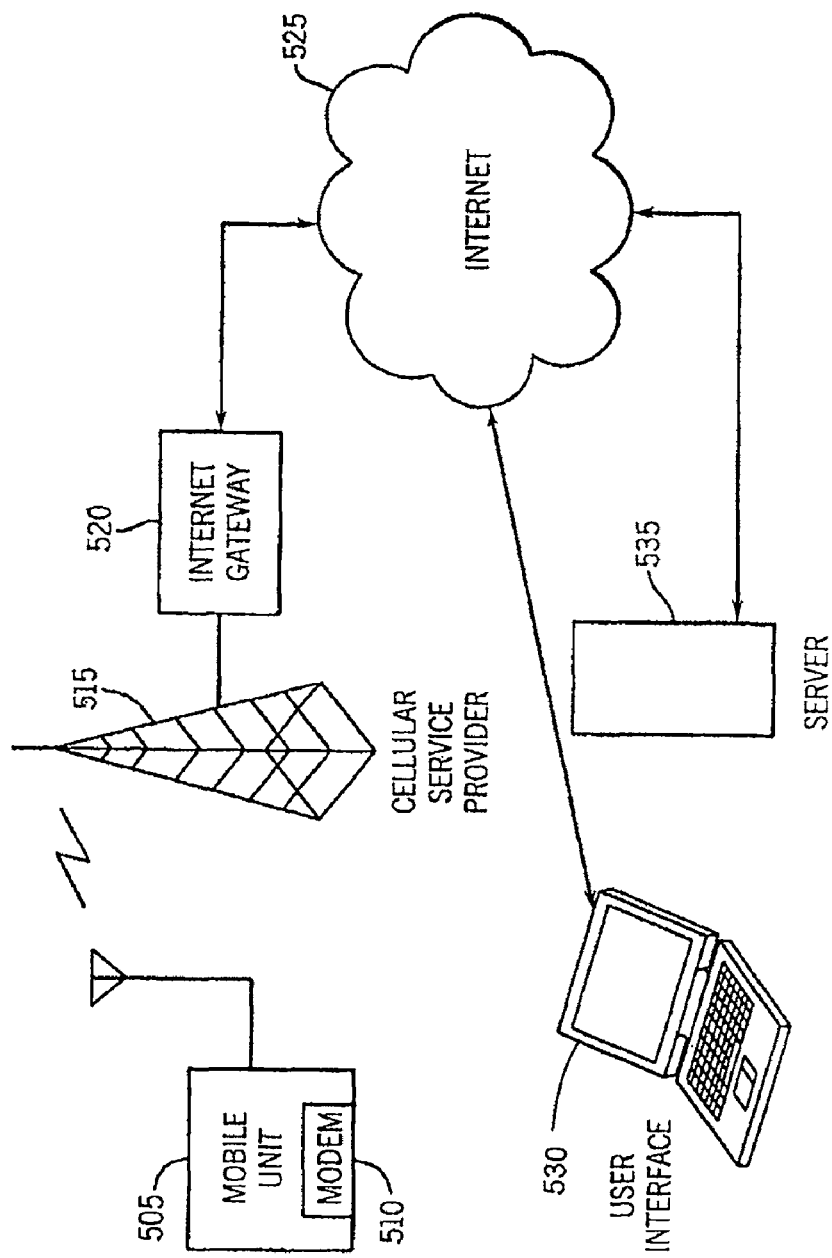
FIG. 5 is a second surveillance and security system having a mobile surveillance and security unit.

Referring now to FIG. 5, the figure shows a surveillance and security system 500 having a mobile surveillance and security unit 505. As used herein, the phrase "system 500" may be used to reference the surveillance and security system 500. As used herein, the phrase "unit 505" may be used to reference the mobile surveillance and security unit 505.

The unit 505 can be similar to the mobile system 100 shown in FIGS. 1-3. The unit 505 includes the cellular modem 510 to communicate with a cellular service provider 515. As is conventionally known, the cellular service provider 515 can include an internet gateway 520 for communicating with the Internet 525. A server 535 or user interface 530 can also communicate with the Internet 525. Before proceeding further, it should also be apparent, that while one unit 505 is shown in FIG. 5, the number of units can vary and that other configurations for the system are possible. For example, the unit 505 can be connected to the system 400 shown in FIG. 4.

FIG. 5 shows multiple apparatus, identified as the user interface 530 and the server 535, in communication with the unit 505. The user interface 535 can be, for example, a conventional computer (e.g., a laptop computer, a desktop computer, a notepad computer, etc.) having TCP/IP capabilities to communicate with the Internet 525. However, it should also be apparent that other devices can be used for the user interface 535, including but not limited to, PDAs or hand-held computers, IP devices, Bluetooth devices, cellular phones, etc. The user interface 535 can communicate (either directly or via the Internet 525) with the unit 505. The user interface can receive information (including, but not limited to, surveillance information, security information, system status information, and unit status information) from the unit 505, monitor the information, record the information, and remotely control the unit 505 (including, but not limited to, the surveillance apparatus, the security apparatus, the PMU, the MCU, and the communication apparatus). The remotely controlling of the unit 505 may or may not be in response to the information received from the unit 505.

The server 535 can communicate with the unit 505 to receive information from the unit 505, monitor the information, record the information, and remotely control the unit 505. The server 535 can also provide the information to the user interface 530 in its original form or in a more refined (e.g., user friendly) form. Further, the server 535 can control the unit 505 in response to commands received from the user interface 530. Before proceeding further, it should be apparent that the server 535 and user interface 530 can monitor and control a plurality of mobile units 505. The monitoring and control of the plurality of units 505 may be accomplished individually, or in a unison or interconnected arrangement.

In operation, the unit 505 (or units 405, 410, or 415) can provide surveillance of a concern, and provide security for or in response to the concern, as previously discussed for the mobile system 100 of FIGS. 1-3. How the unit 505 provides surveillance and security can depend on the surveillance apparatus and the security apparatus supported by the unit 505. The power for the unit 505 depends on the power sources supported by the unit 505. The means for communicating with the unit 505 (or units 405, 410, or 415) can depend on the network used and the apparatus or system in communication with the unit 505.

For example, if the mobile system 100 is coupled to the system 500 shown in FIG. 5, the IP camera 265 can be used for surveillance of a space and the lights 280a and 280b can be used for providing security. The control of the IP camera 265 and the lights 280a and 280b can be performed locally and/or remotely (e.g., by the server 535 or user interface 530). Additionally, the server 535 and user interface 530 can monitor and control other elements of the mobile system 100 (e.g., receive information from the power manager 240, control the generator 205, etc.).

As a specific example, the IP camera 265 can communicate continuous video, slow scan video, or video on motion to the system controller 245, the server 535, and/or the user interface 530. One or more of the system controller 245, the server 535, and/or the user interface 530, can control the mobile system 100 in response to the video. The control of the mobile system 100 can include controlling the surveillance apparatus 250 (e.g., controlling the pan/tilt of the camera and/or controlling other surveillance apparatus of the sensor suite 275) and/or controlling the security apparatus 255 (e.g., controlling the lights 280a and 280b in response to a monitored condition). Additionally, the server 535 and/or user interface 530 can monitor the other apparatus, devices, and elements of the mobile system 100 for operational and safety concerns. It should also be apparent that the mobile system 100, the server 535, and/or the user interface 530 can record information relating to the mobile system 100.

Thus, the invention provides, among other things, a new and useful mobile surveillance and/or security system, a new and useful surveillance and/or security system having a mobile surveillance and/or security unit, and new and useful methods of operating the same.

What is claimed is:

1. A mobile surveillance and/or security unit, comprising:
a first power source;
a trailer including an enclosure for securing the first power source;
a tower mounted to the trailer, the enclosure securing a means for pivoting the tower between a horizontal position and a vertical position;
a plurality of apparatus positioned on the tower, wherein at least one of the plurality of apparatus is a communication apparatus;
a second power source positioned at the top of the tower above the plurality of apparatus and configured to provide power to the plurality of apparatus; and a power management unit secured in the enclosure and configured to monitor a parameter of the first power source and to transmit data related to the monitored parameter to a remote unit via the communication apparatus.

2. The unit of claim 1, wherein the second power source is a photovoltaic array.

3. The unit of claim 1, further comprising an apparatus manager, and a communications manager, the apparatus manager and the communications manager positioned on the tower.

4. The unit of claim 1, wherein an input apparatus transmits information to the remote unit via the communication apparatus.

5. The unit of claim 1, wherein the first power source includes at least one of a battery, an engine driven generator, and a photovoltaic array.

6. The unit of claim 1, wherein the power management unit transmits a status to the remote unit automatically when an alarm condition of the first power source is detected.

7. The unit of claim 1, wherein the tower pivots between a horizontal position for transporting and a vertical position for operating.

8. The unit of claim 1, wherein the trailer includes a plurality of support elements.

9. A mobile surveillance and/or security unit, comprising:
    a trailer;
    a tower mounted to the trailer;
    a power manager;
    a communication manager;
    an apparatus manager;
    an input device positioned on the tower;
    a communication apparatus coupled to the communication manager; and
    a power source configured to provide power to the input device, the power source including a battery, a photovoltaic array, and an engine powered generator;
    wherein the power manager is configured to monitor the battery, the photovoltaic array, and the engine powered generator and to transmit data related to the battery, the photovoltaic array, and the engine powered generator to a remote unit via the communication apparatus.

10. The unit of claim 9, wherein the power manager is configured to control the power source.

11. The unit of claim 9, wherein the power manager monitors at least one of a battery charge, a photovoltaic array capacity, an engine fuel level, an engine oil pressure, and an engine temperature.

12. The unit of claim 11, wherein the power manager communicates a status of the power source when an alarm condition occurs.

13. The unit of claim 9, wherein the power manager starts the generator to recharge the battery when a charge of the battery is below a threshold and a capacity of the photovoltaic array is not sufficient to recharge the battery.

14. The unit of claim 9, wherein the communication apparatus includes means for communicating with the remote unit.

15. The unit of claim 9, further comprising a positioning mechanism coupled to the input device.

16. The unit of claim 15, wherein the remote unit transmits instructions to the positioning mechanism.

17. The unit of claim 9, further comprising an output device.

18. The unit of claim 17, wherein the output device includes a light.

19. The unit of claim 18, wherein the power manager automatically starts the generator when the light is on.

20. A method of powering a mobile surveillance and/or security unit, comprising:
    coupling at least one surveillance and/or security apparatus to a battery;
    monitoring a charge of the battery;
    monitoring a capacity of a photovoltaic array providing a charge to the battery;
    operating a generator when the battery charge is below a first threshold and the capacity of the photovoltaic array is below a second threshold; and
    transmitting data about the battery, the photovoltaic array, and the generator to a remote unit.

21. The method of claim 20, further comprising starting the generator using a second battery.

22. The method of claim 20, further comprising positioning a power source different than the battery, the generator, and the photovoltaic array on the top of a tower of the mobile surveillance and/or security unit.

23. The method of claim 20, wherein the photovoltaic array is positioned on the top of a tower of the mobile surveillance and/or security unit.

24. The method of claim 20, further comprising monitoring one or more parameters associated with an engine of the generator.

25. The method of claim 24, further comprising transmitting a status of the engine to the remote unit when the one or more monitored parameters indicate an alarm condition.

26. The method of claim 24, wherein the one or more monitored parameters include at least one of fuel level, oil pressure, and engine temperature.

27. A mobile system, comprising:
    a plurality of mobile surveillance and/or security units including
    a trailer,
    a tower mounted to the trailer,
    a plurality of apparatus positioned on the tower, wherein at least one of the plurality of apparatus is a communication apparatus,
    a plurality of power sources including a battery, a photovoltaic array, and a generator, the battery configured to provide power to the plurality of apparatus; and
    a power management unit configured to monitor a charge of the battery and a capacity of the photovoltaic array and to operate the generator when the battery charge is below a first threshold and the capacity of the photovoltaic array is below a second threshold, and to transmit data related to the battery, the photovoltaic array, and the generator to a remote unit via the communication apparatus;
    wherein one of the plurality of units includes a wireless router.

28. The system of claim 27, further comprising a user interface linked to the router.

29. The system of claim 28, wherein the user interface communicates with the plurality of units through the router.

* * * * *